US009853268B2

(12) United States Patent
Ryu et al.

(10) Patent No.: US 9,853,268 B2
(45) Date of Patent: Dec. 26, 2017

(54) SEPARATOR AND ELECTROCHEMICAL DEVICE HAVING THE SAME

(71) Applicants: LG Chem, Ltd., Seoul (KR); TORAY INDUSTRIES, INC., Tokyo (JP)

(72) Inventors: Bo-Kyung Ryu, Daejeon (KR); Joo-Sung Lee, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 632 days.

(21) Appl. No.: 14/191,738

(22) Filed: Feb. 27, 2014

(65) Prior Publication Data
US 2014/0178740 A1    Jun. 26, 2014

Related U.S. Application Data

(63) Continuation of application No. PCT/KR2013/003413, filed on Apr. 22, 2013.

(30) Foreign Application Priority Data

Apr. 20, 2012  (KR) .................... 10-2012-0041456
Apr. 22, 2013  (KR) .................... 10-2013-0044338

(51) Int. Cl.
*H01M 2/16* (2006.01)
*H01M 2/14* (2006.01)
(Continued)

(52) U.S. Cl.
CPC ............ *H01M 2/145* (2013.01); *H01G 11/52* (2013.01); *H01M 2/166* (2013.01); *H01M 2/168* (2013.01);
(Continued)

(58) Field of Classification Search
CPC ................... H01M 2/14; H01M 2/145; H01M 2/16–2/1686
(Continued)

(56) References Cited

U.S. PATENT DOCUMENTS 2,761,417 A   9/1956  Russell et al.
2,761,791 A   9/1956  Russell
(Continued)

FOREIGN PATENT DOCUMENTS

EP   0858119 A2   8/1998
GB   2070459 A    9/1981
(Continued)

OTHER PUBLICATIONS

International Search Report for PCT/KR2013/003413 dated Sep. 5, 2013.
(Continued)

*Primary Examiner* — Jonathan G Leong
(74) *Attorney, Agent, or Firm* — Lerner, David, Littenberg, Krumholz & Mentlik, LLP

(57) ABSTRACT

The present invention refers to a method of preparing a separator, a separator prepared therefrom and an electrochemical device having the separator. The method of preparing a separator according to the present invention comprises providing a planar and porous substrate having multiple pores; and coating a first slurry on at least one surface of the porous substrate through a slot section to form a porous coating layer, while continuously coating a second slurry on the porous coating layer through a slide section adjacent to the slot section to form a layer for adhesion with an electrode, the first slurry comprising inorganic particles, a first binder polymer and a first solvent, and the second slurry comprising a second binder polymer and a second solvent.

12 Claims, 4 Drawing Sheets

(51) Int. Cl.
*H01G 11/52* (2013.01)
*H01M 8/1069* (2016.01)

(52) U.S. Cl.
CPC ........ *H01M 2/1686* (2013.01); *H01M 8/1069* (2013.01); *Y02E 60/13* (2013.01); *Y02P 70/56* (2015.11)

(58) Field of Classification Search
USPC .......................................... 29/623.5; 429/144
See application file for complete search history.

(56) References Cited

U.S. PATENT DOCUMENTS

| | | | |
|---|---|---|---|
| 5,834,052 | A | 11/1998 | Fukumura et al. |
| 7,700,019 | B2 | 4/2010 | Lavoie et al. |
| 2004/0029008 | A1 | 2/2004 | Winterberg et al. |
| 2004/0159964 | A1 | 8/2004 | Lavoie et al. |
| 2008/0038472 | A1 | 2/2008 | Suzuki et al. |
| 2011/0259505 | A1 | 10/2011 | Lee et al. |
| 2012/0219840 | A1 | 8/2012 | Choi et al. |

FOREIGN PATENT DOCUMENTS

| | | | |
|---|---|---|---|
| JP | H9-223499 | | 8/1997 |
| JP | 2003-39003 | A | 2/2003 |
| JP | 2007280781 | A | 10/2007 |
| JP | 2007-283293 | A | 11/2007 |
| KR | 20100099667 | A | 9/2010 |
| KR | 20120003217 | A | 1/2012 |
| WO | WO 2011040704 | A2 * | 4/2011 ............ H01M 2/145 |

OTHER PUBLICATIONS

Lin, Yao-Nan, "Minimum Wet Thickness for Double-Layer Slide-Slot Coating of Poly(Vinyl-Alcohol) Solutions." Polymer Engineering & Science, vol. 45, No. 2, Oct. 19, 2005, pp. 1590-1599. XP055120812, ISSN: 0032-3888, DOI: 10.1 002/pen.20454.

* cited by examiner

SEPARATOR AND ELECTROCHEMICAL DEVICE HAVING THE SAME

CROSS-REFERENCE TO RELATED APPLICATION

This application is a continuation of International Application No. PCT/KR2013/003413 filed on Apr. 22, 2013, which claims priority under 35 USC 119(a) to Korean Patent Application No. 10-2012-0041456 filed in the Republic of Korea on Apr. 20, 2012 and Korean Patent Application No. 10-2013-0044338 filed in the Republic of Korea on Apr. 22, 2013, the disclosures thereof are incorporated herein by reference.

TECHNICAL FIELD

The present invention relates to a method of preparing a separator for an electrochemical device such as a lithium secondary battery, more particularly to a method of preparing a separator having a porous coating layer formed on a porous substrate having multiple pores; a separator prepared therefrom; and an electrochemical device having the separator.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause electrical short between a cathode and an anode.

In order to solve the above safety problems of electrochemical devices, there has been proposed a separator having a porous coating layer which is formed by coating a mixture of inorganic particles and a binder polymer on at least one surface of a porous substrate. In the separator, the inorganic particles, which are present in the porous coating layer formed on the porous substrate, act as a spacer capable of maintaining the physical form of the porous coating layer, thereby preventing the porous substrate from thermal shrinkage even if electrochemical devices overheat. Also, an interstitial volume is present between the inorganic particles to form a fine pore.

Such a separator is required to adhere with an electrode in a stacking and folding process, and therefore, it is favorable for a layer for adhesion with an electrode to be significantly exposed on the porous substrate layer of the separator for good adhesion with the electrode. However, in the formation of such a layer for adhesion with an electrode, when a binder polymer is used an excessive amount, the performance of electrochemical devices may be deteriorated.

DISCLOSURE

Technical Problem

The present invention is designed to solve the above-mentioned problems, and therefore it is an object of the present invention to provide a method of preparing a separator, which can provide a thin layer for adhesion with an electrode without deteriorating the thermal stability of the separator, thereby enabling good assembling work and preventing the performance of electrochemical devices from being deteriorated by the layer for adhesion with an electrode; a separator prepared from the method, and an electrochemical device comprising the separator.

Technical Solution

In order to achieve the above object, in accordance with one aspect of the present invention, there is provided a method of preparing a separator, comprising providing a planar and porous substrate having multiple pores; and coating a first slurry on at least one surface of the porous substrate through a slot section to form a porous coating layer, while continuously coating a second slurry on the porous coating layer through a slide section adjacent to the slot section to form a layer for adhesion with an electrode, the first slurry comprising inorganic particles, a first binder polymer and a first solvent, and the second slurry comprising a second binder polymer and a second solvent.

In the present invention, the slide section is inclined so as to form an angle (θ) of 10 to 80° with the slot section.

Also, the first slurry and the second slurry may each independently have a viscosity of 5 to 100 cp.

In addition, the first slurry may be discharged at a rate faster than that of the second slurry.

The first slurry and the second slurry may be discharged at a rate of 500 to 2,000 ml/min, and at a rate of 200 to 1,200 ml/min, respectively.

The layer for adhesion with an electrode may have a thickness satisfying 1/10 or less of the thickness of the porous coating layer.

The porous substrate may be a polyolefin-based porous membrane.

The slot section and the slide section may be formed in an integrated slide-slot die, or independently formed in a slot die and a slide die, respectively.

Meanwhile, the inorganic particles used in the present invention may have an average diameter of 0.001 to 10 μm, and they may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$—$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ inorganic particles and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

In the present invention, the first binder polymer and the second binder polymer may be each independently selected from the group consisting of polyvinylidene fluoride-co-hexafluoro propylene, polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxyl methyl cellulose, acrylonitrile-styrene-butadiene copolymer, polyimide and a mixture thereof.

Further, in accordance with another aspect of the present invention, there is provided a separator prepared by the above method.

Furthermore, in accordance with still another aspect of the present invention, there is provided an electrochemical device comprising a cathode, an anode, a separator interposed between the cathode and the anode and an electrolyte solution, wherein the separator is defined in the present invention. The electrochemical device may be a lithium secondary battery.

Advantageous Effects

According to one embodiment of the present invention, in the preparation of a separator, a second slurry comprising a binder polymer is smoothly discharged through a slide section without an external force to coat a layer for adhesion with an electrode on the top of a porous coating layer which is formed on a porous substrate by discharging a first slurry through a slot section, thereby preventing the inter-mixing of the porous coating layer and the layer for adhesion with an electrode and eventually effectively forming the layer for adhesion with an electrode.

Also, the layer for adhesion with an electrode can be thinly formed on the top of the porous coating layer which is formed on at least one surface of a substrate for a separator, thereby improving the adhesiveness of the separator to an electrode and preventing the performance of an electrochemical device from being deteriorated.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Figure 1:
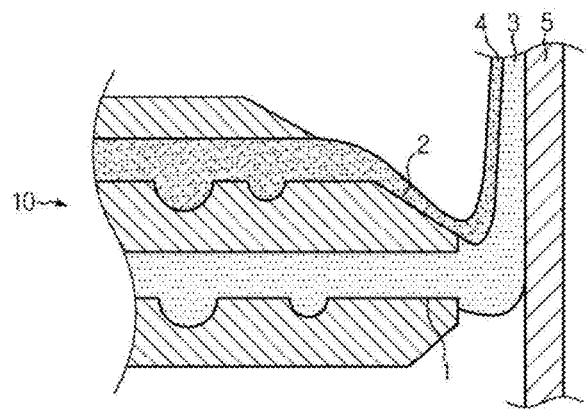
FIG. 1 schematically shows procedures for preparing a separator in accordance with one embodiment of the present invention.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, the embodiments and the drawings proposed herein is just a preferable example for the purpose of illustrations only, not intended to limit the scope of the disclosure, so it should be understood that other equivalents and modifications could be made thereto without departing from the spirit and scope of the disclosure.

In order to prepare a separator according to one embodiment of the present invention, a planar and porous substrate having multiple pores is first provided.

The porous substrate used in the present invention may be any one which is conventionally used in electrochemical devices, for example, a polyolefin-based membrane or non-woven fabric, but the present invention is not particularly limited thereto.

The polyolefin-based membrane may be made of polyethylene such as high-density polyethylene, linear low-density polyethylene, low-density polyethylene and ultra-high molecular weight polyethylene, polypropylene, polybutylene, polypentene or a mixture thereof.

The non-woven fabric may be made of polyolefin, as well as polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, or a mixture thereof. Also, the non-woven fabric may be a spun-bonded or melt-blown fabric consisting of long fibers.

Also, the porous substrate may have a thickness of 1 to 100 μm, preferably 5 to 50 μm, but is not particularly limited thereto.

In addition, the porous substrate may have a pore size of 0.001 to 50 μm, and a porosity of 10 to 95%, but is not particularly limited thereto.

Subsequently, a first slurry comprising inorganic particles, a first binder polymer and a first solvent is coated on at least one surface of the porous substrate through a slot section to form a porous coating layer, while a second slurry comprising a second binder polymer and a second solvent is continuously coated on the porous coating layer through a slide section adjacent to the slot section to form a layer for adhesion with an electrode.

In the present invention, the inorganic particles are not particularly limited if they are electrochemically stable. That is, the inorganic particles which may be used in the present invention are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher. Non-limiting examples of the inorganic particles having a dielectric constant of 5 or higher include $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$—$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, TiO, inorganic particles and a mixture thereof.

Also, as the inorganic particles, inorganic particles having the ability to transport lithium ions, i.e., lithium-containing inorganic particles which can transfer lithium ions without holding them may be used. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

In the separator of the present invention, the inorganic particles are not particularly limited to their size, but preferably have an average diameter of 0.001 to 10 μm for forming the porous coating in a uniform thickness and achieving a proper porosity.

When the average diameter of the inorganic particles satisfies such range, the dispersibility of the inorganic particles may be prevented from decreasing and the thickness of the porous coating layer may be properly controlled.

Further, non-limiting examples of the first binder polymer and the second binder polymer include polyvinylidene fluoride-co-hexafluoro propylene, polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide and a mixture thereof, but are not limited thereto.

In the present invention, the first solvent is not particularly limited if it can dissolve a binder polymer and disperse inorganic particles, and the second solvent is not particularly limited if it can disperse and dissolve a binder polymer, but solvents having a low boiling point are favorable because they can be easily removed later. Non-limiting examples of the usable first and second solvents include acetone, tetrahydrofuran, methylene chloride, chloroform, dimethylformamide, N-methyl-2-pyrrolidone (NMP), cyclohexane, water and a mixture thereof.

Figure 2:
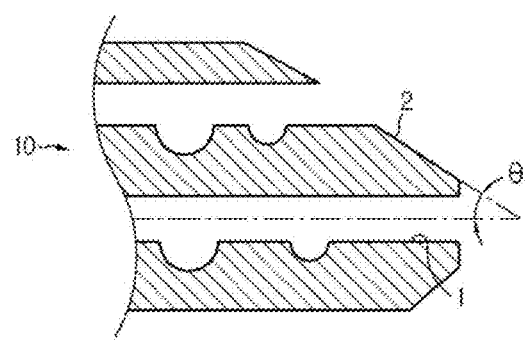
FIG. 2 shows an angle (θ) which is formed by a slide section and a slot section in a slide-slot die according to one embodiment of the present invention.

Meanwhile, with reference to FIGS. 1 and 2, the slot section 1 and the slide section 2 may be formed in an integrated slide-slot die 10, but the present invention is not limited thereto. Alternatively, the slot section 1 and the slide section 2 may be independently formed in a slot die and a slide die, respectively.

The slide section 2 is adjacent to the slot section 1 and may be inclined to the bottom so that the second slurry can slide down from the top of the slide section 2 just by the force of gravity, without any external force. If the second slurry to be coated is discharged through an additional slot die, a strong shear stress is applied and the first slurry and the second slurry may be mixed in the discharging part of the die. However, as stated, the second slurry is discharged through the slide section and coated on a desired part without applying any external force, thereby preventing the inter-mixing of the porous coating layer and the layer for adhesion with an electrode.

In the present invention, the inclined slide section 1 maintains an angle (θ) of 10 to 80°, preferably 30 to 60° with the slot section 2. If the angle formed by the slot section 1 and the slide section 2 satisfies such numerical range, each coating thickness of the first and the second slurries can be easily controlled, even if the first and the second slurries each have a low viscosity. However, if the angle is very small, the part of slide section 2 in which the second slurry moves becomes long and the second slurry may be vaporized, thereby leading to the non-uniform thickness of a layer for adhesion with an electrode.

The first slurry having inorganic particles dispersed and dissolved in a first solvent is supplied through the slot section 1, while the second slurry having a binder polymer dispersed and dissolved in a second solvent is supplied through the slide section 2. Specifically, the porous substrate 5 is supplied by a rotating roller, and the first slurry is coated on the porous substrate 5 to form a porous coating layer 3, and continuously, the second slurry is coated on the porous coating layer 3 to form a layer 4 for adhesion with an electrode.

In the present invention, the first slurry may have a viscosity of 5 to 100 cp, preferably 10 to 20 cp, and the second slurry may have a viscosity of 5 to 100 cp, preferably 10 to 20 cp.

Meanwhile, the first slurry may be discharged at a rate faster than that of the second slurry. The first slurry may be discharged at a rate of 500 to 2,000 ml/min, preferably 1,000 to 1,500 ml/min, and the second slurry may be discharged at a rate of 200 to 1,200 ml/min, preferably at a rate of 500 to 900 ml/mi. When such numerical range is satisfied, a thin layer for adhesion with an electrode can be formed without any inter-mixing between two layers.

Although FIG. 1 illustrates the formation of coating layers on only one surface of the porous substrate, the present invention is not limited thereto. That is, coating layers may be formed on both surfaces of the porous substrate to prepare a separator.

In the present invention, the layer for adhesion with an electrode may have a thickness satisfying 1/10 or less, preferably 1/1,000 to 5/100 of the thickness of the porous coating layer. If an excessive amount of a binder polymer is present in the separator, there is a possibility the performance of electrochemical devices may be deteriorated. Accordingly, it is preferred for the layer for adhesion with an electrode to be thin.

The thickness of the porous coating layer may range from 0.01 to 20 μm, and the thickness of the layer for adhesion with an electrode may range from 0.0001 to 2 μm, preferably 0.0005 to 1 μm, but the present invention is not limited thereto.

A separator prepared by the above-mentioned method may be interposed between a cathode and an anode, followed by lamination, to prepare an electrode assembly used in electrochemical devices. The electrochemical devices may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

In the present invention, electrodes to be used together with the separator are not particularly limited, and may be manufactured by binding an electrode active material to an electrode current collector according to a conventional method known in the art. As a cathode active material, those that are commonly used in cathodes of conventional electrochemical devices may be used. Non-limiting examples of the cathode active material may include a lithium-manganese oxide, a lithium-cobalt oxide, a lithium-nickel oxide, a lithium-iron oxide, and a combination thereof, i.e., a lithium-containing composite oxide. Also, as an anode active material, those that are commonly used in anodes of conventional electrochemical devices may be used, and non-limiting examples thereof include metallic lithium, lithium alloys, and lithium intercalation materials such as carbon, petroleum coke, activated carbon, graphite and other carbonaceous materials. Non-limiting examples of a usable cathode current collector include aluminum foils, nickel foils and a combination thereof. Non-limiting examples of a usable anode current collector include copper foils, gold foils, nickel foils, copper alloy foils and a combination thereof.

The electrolyte solution which may be used in the electrochemical device of the present invention is obtained by dissolving or dissociating a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

The separator of the present invention may be applied in batteries by lamination or stack of the separator and the electrodes, and folding, as well as a conventional winding process.

The foregoing disclosure is given by way of illustration only, and various changes and modifications within the spirit and scope of the disclosure will become apparent to those skilled in the art from this detailed description. Accordingly, it should be understood that the Examples of the present invention are provided for the purpose of illustrations only and to better explain to a person having ordinary skill in the art, and is not intended to limit the scope of the present invention. The scope of the present to be protected should be defined by the claims, all technical spirits equivalent thereto should be interpreted to be fallen within the scope of the present invention.

Hereinafter, preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

Example 1

(1) Preparation of First Slurry

Aluminum oxide ($Al_2O_3$) as inorganic particles, a mixture of polyvinylidene fluoride-co-chlorotrifluoro ethylene (PVdF-CTFE) and cyanoethyl pullulan as a first binder polymer, and acetone as a first solvent were mixed in a weight ratio of 18:2:80, to obtain a first slurry having a viscosity of 10 cP.

(2) Preparation of Second Slurry

A mixture of polyvinylidene fluoride-co-chlorotrifluoro ethylene (PVdF-CTFE) and cyanoethyl pullulan as a second binder polymer, and acetone as a second solvent were mixed in a weight ratio of 3:97, to obtain a second slurry having a viscosity of 10 cP.

(3) Preparation of Separator

A 16 μm-thick polyolefin membrane (Celgard, C210) was used as a porous substrate, on which the first slurry was supplied through the slot section of a slide-slot die and the second slurry was supplied through the slide section thereof, so that the first slurry was directly coated on the top of the porous substrate to form a porous coating layer and the second slurry was continuously coated on the top of the porous coating layer to form a layer for adhesion with an electrode. At this time, the slide section was positioned to form an angle (θ) of 45° with the slot section, the discharging rate of the first slurry was controlled to be 1200 ml/min, and that of the second slurry was controlled to be 700 ml/min.

Comparative Example

The procedures of the Example were repeated except that a dual slot die was used to supply the first slurry and the second slurry through each slot section so that the first slurry was directly coated on the top of the porous substrate to form a porous coating layer and the second slurry was continuously coated on the top of the porous coating layer to form a layer for adhesion with an electrode. Thereby, a separator was prepared.

Performance Evaluation

First, a side of each die used in the Example and the Comparative Example was observed when each slurry was discharged from each die.

Figure 3:
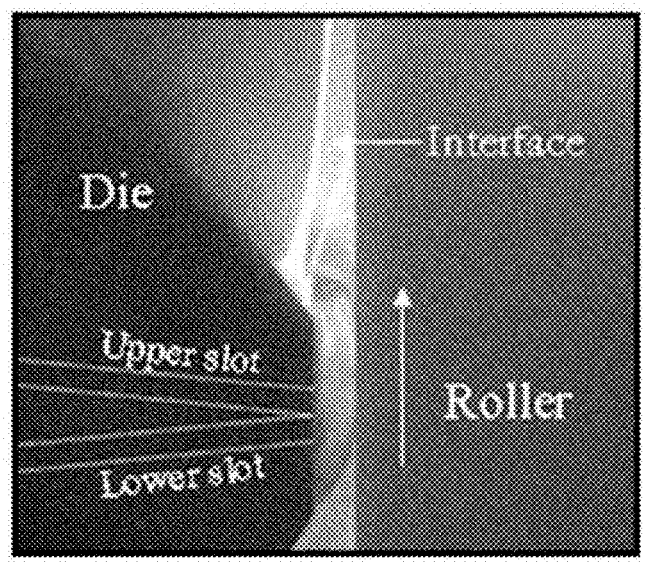
FIG. 3 is a photograph for a side of a dual slot die when slurries are discharged therefrom, in the Comparative Example presented herein.
Figure 4:
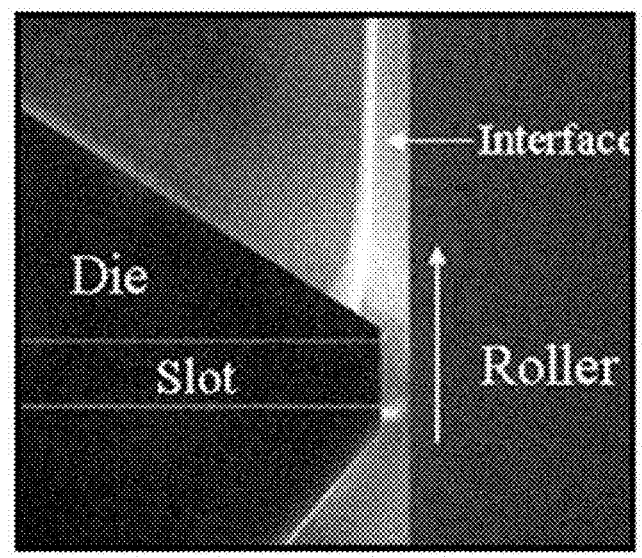
FIG. 4 is a photograph for a side of a slide-slot die when slurries are discharged therefrom, according to one embodiment of the present invention.

FIG. 3 shows a photograph for a side of a dual slot die in the Comparative Example, and FIG. 4 shows a photograph for a side of a slide-slot die used in the Example, when the slurries were discharged through each die.

In comparison of FIG. 3 and FIG. 4, when the slurries were coated on the porous substrate by a dual slot die according to the Comparative Example, the first slurry and the second slurry were inter-mixed with each other, as can be seen from FIG. 3. However, when the slurries were coated on the porous substrate by a slide-slot die according to the Example, the inter-mixing between the first slurry and the second slurry was prevented, as can be seen from FIG. 4.

Meanwhile, the separators prepared in the Example and the Comparative Example were measured for their properties, and the results thereof are shown in Table 1.

TABLE 1

| Properties | Example | Comparative Example |
| --- | --- | --- |
| Thickness of Separator | 7.58 μm | 7.83 μm |
| Loading Rate of Layer for Adhesion with Electrode | 14.48 g/m$^2$ (1.91 g/cm$^3$) | 14.52 g/m$^2$ (1.86 g/cm$^3$) |
| Gurley Number | 741 s/100 cc | 728 s/100 cc |
| Adhesiveness of Separator | 24.2 gf/25 mm | 12.3 gf/25 mm |

As can be seen in Table 1, although the separators of the Example and the Comparative Example exhibited similar loading rate of the layer for adhesion with an electrode, the separator of the Example was confirmed to have nearly doubled in adhesiveness, as compared with that of the Comparative Example. Such a result means that the inter-mixing is prevented to allow much more of the second binder polymer to be present in the surface of the separator and to allow the formation of an even layer for adhesion with an electrode.

Figure 5:
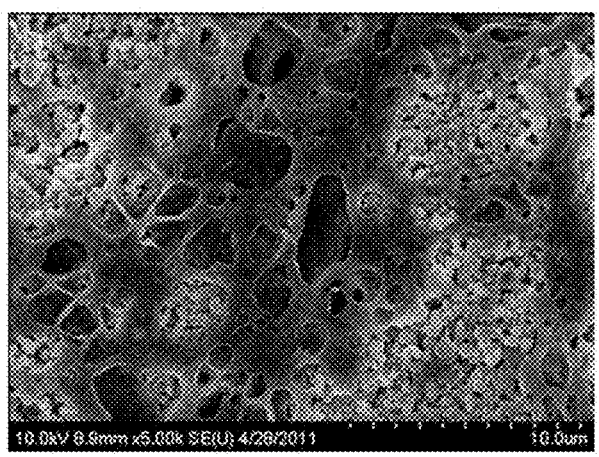
FIG. 5 is an extended SEM photograph of the cross-section of a separator prepared according to one embodiment of the present invention.
Figure 6:
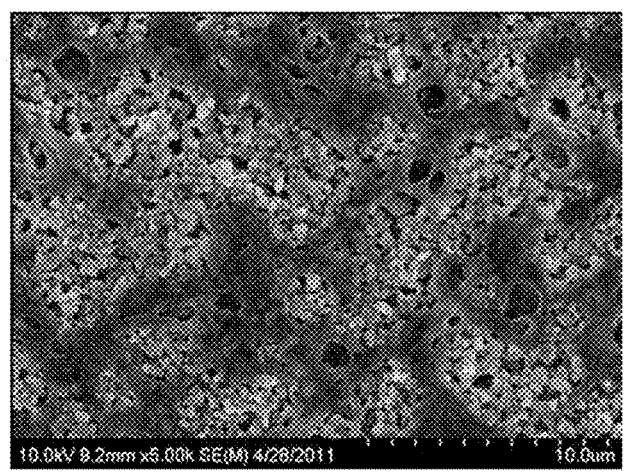
FIG. 6 is an extended SEM photograph of the cross-section of a separator prepared in the Comparative Example presented herein.

FIGS. 5 and 6 show an extended SEM photograph of the cross-section of each separator prepared in the Example and the Comparative Example, respectively, in which dark parts indicate the formation of a layer for adhesion with an electrode. The results confirmed that in the separator of the Example, the layer for adhesion with an electrode was coated more evenly and broadly.

Figure 7:
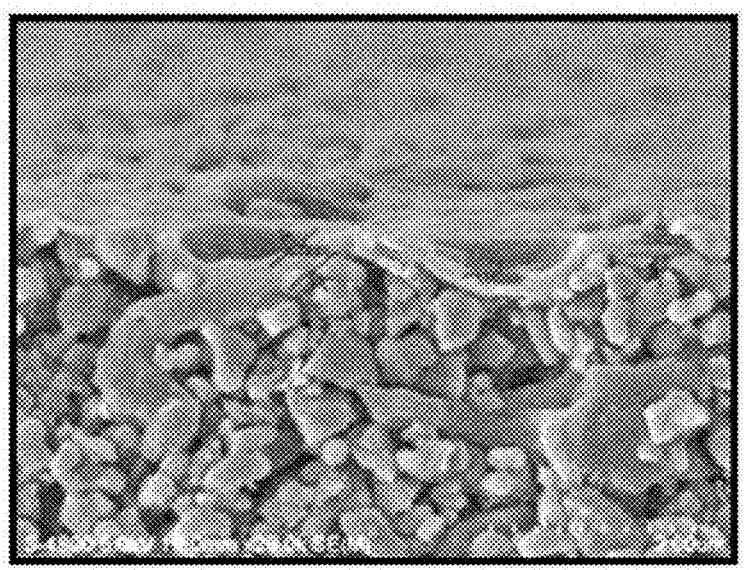
FIG. 7 is an extended SEM photograph of the side of a separator prepared according to one embodiment of the present invention.

Meanwhile, FIG. 7 shows an extended SEM photograph of the side of the separator prepared in the Example of the present invention. From FIG. 7, it was confirmed that a thin layer for adhesion with an electrode was formed on the top of the porous coating layer, which can improve adhesiveness to an electrode and prevent the performance of electrochemical devices from being deteriorated.

What is claimed is:

1. A method of preparing a separator, comprising:
   providing a planar and porous substrate having multiple pores;
   providing a slot-die comprising a slot section and a slide section; and
   coating a first slurry on at least one surface of the porous substrate through the slot section to form a porous coating layer, while continuously coating a second slurry on the porous coating layer through the slide section adjacent to the slot section only by the force of gravity to form a layer for adhesion with an electrode,
   wherein the first slurry for forming the porous coating layer comprises inorganic particles, a first binder polymer and a first solvent,
   wherein the second slurry for forming the layer for adhesion comprises a second binder polymer and a second solvent,
   wherein the first binder polymer and the second binder polymer are each independently selected from polyvinylidene fluoride-co-hexafluoro propylene, polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxyl methyl cellulose, acrylonitrile-styrene-butadiene copolymer, polyimide or a mixture thereof,
   wherein the first slurry and the second slurry each independently have a viscosity of 10 to 20 cp,
   wherein the first slurry is discharged at a rate faster than that of the second slurry,
   wherein the layer for adhesion has a thickness of 0.0005 μm to 1 μm, and
   wherein the slide section is inclined to form an angle (θ) of 10 to 60° with the slot section.

2. The method of claim 1, wherein the first slurry is discharged at a rate of 500 to 2,000 ml/min, and the second slurry is discharged at a rate of 200 to 1,200 ml/min.

3. The method of claim 1, wherein the layer for adhesion with an electrode has a thickness satisfying ⅒ or less of the thickness of the porous coating layer.

4. The method of claim 1, wherein the porous substrate is a polyolefin-based porous membrane.

5. The method of claim 1, wherein the slot section and the slide section are formed in an integrated slide-slot die, or independently formed in a slot die and a slide die, respectively.

6. The method of claim 1, wherein the inorganic particles have an average diameter of 0.001 to 10 μm.

7. The method of claim 1, wherein the inorganic particles are selected from inorganic particles having a dielectric constant of 5 or higher, inorganic particles having the ability to transport lithium ions, or a mixture thereof.

8. The method of claim 7, wherein the inorganic particles having a dielectric constant of 5 or higher are selected from the group consisting of $BaTiO_3$, $Pb(Zr_x,Ti_{1-x})O_3$ (PZT, 0<x<1), $Pb_{1-x}La_xZr_{1-y}Ti\ O_3$ (PLZT, 0<x<1, 0<y<1), (1-x)$Pb(Mg_{1/3}Nb_{2/3})O_{3-x}PbTiO_3$ (PMN-PT, 0<x<1), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ inorganic particles or a mixture thereof.

9. The method of claim 7, wherein the inorganic particles having the ability to transport lithium ions are selected from lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$ type glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, or a mixture thereof.

10. A separator prepared by the method of claim 1.

11. An electrochemical device, comprising a cathode, an anode and a separator interposed between the cathode and the anode, wherein the separator is defined in claim 10.

12. The electrochemical device according to claim 11, which is a lithium secondary battery.

* * * * *